United States Patent [19]
Whalen et al.

[11] Patent Number: 6,006,684
[45] Date of Patent: Dec. 28, 1999

[54] MOUNT FOR AGRICULTURAL ADDITIVE CONDUIT

[75] Inventors: Bernard F. Whalen, Macomb; Patrick T. Whalen; Ronald E. Chenoweth, both of Colchester, all of Ill.

[73] Assignee: Yetter Manufacturing Company, Colchester, Ill.

[21] Appl. No.: 09/035,467

[22] Filed: Mar. 5, 1998

[51] Int. Cl.⁶ .................................................. A01C 15/00
[52] U.S. Cl. ............................................................ 111/121
[58] Field of Search .................................... 111/154, 118, 111/119, 155, 121, 163, 167; 239/516

[56] References Cited

U.S. PATENT DOCUMENTS

| | | | |
|---|---|---|---|
| 2,594,284 | 4/1952 | Blue . | |
| 2,912,944 | 11/1959 | Snow et al. | 111/7 |
| 3,207,389 | 9/1965 | Beebe et al. | 222/486 |
| 3,745,944 | 7/1973 | Yetter et al. | 111/7 |
| 3,831,818 | 8/1974 | Dumont | 222/145 |
| 3,926,131 | 12/1975 | Collins | 111/6 |
| 4,034,686 | 7/1977 | Collins | 111/7 |
| 4,178,860 | 12/1979 | Hines et al. | 111/7 |
| 4,284,243 | 8/1981 | Shaner | 239/469 |
| 4,426,940 | 1/1984 | Brain et al. | 111/7 |
| 4,656,957 | 4/1987 | Williamson et al. | 111/7 |
| 4,850,291 | 7/1989 | Masuko et al. | 111/7.2 |
| 4,903,618 | 2/1990 | Blair | 111/118 |
| 4,947,770 | 8/1990 | Johnston | 111/121 |
| 4,986,200 | 1/1991 | Johnston | 111/121 |
| 4,987,841 | 1/1991 | Rawson et al. | 111/121 |
| 5,027,724 | 7/1991 | Ptacek et al. | 111/121 |
| 5,271,342 | 12/1993 | Neidhardt | 111/119 |
| 5,370,068 | 12/1994 | Rawson et al. | 111/121 |
| 5,467,723 | 11/1995 | McIvor-Dean et al. | 111/123 |
| 5,531,171 | 7/1996 | Whitesel et al. | 111/121 |
| 5,590,611 | 1/1997 | Smith | 111/127 |
| 5,622,124 | 4/1997 | Smith et al. | 111/121 |
| 5,865,131 | 2/1999 | Dietrich, Sr. et al. | 111/121 |

*Primary Examiner*—Christopher J. Novosad
*Attorney, Agent, or Firm*—Lee, Mann, Smith, McWilliams, Sweeney & Ohlson

[57] ABSTRACT

A coulter disc assembly is pulled by a tractor or other motorized vehicle to create a trench in the ground into which seeds are dispensed. This mounting arrangement of the present invention allows a farmer to inject agricultural additives, such as either liquid or dry fertilizer, into the ground so as to come into contact with the seed immediately after the trench is created and before it is covered over. The mounting arrangement consists of an elastomeric mounting block adapted to connect to a coulter disc frame. A rigid guide rod extends from the mounting block downwardly toward the ground. One end of a tube is connected to a supply of agricultural additives and the other end to the lower end of the guide rod. As the coulter disc passes through the ground to create a trench, the lower end of the guide rod is carried in the trench. As the guide rod engages the side walls of the trench, the rubber mounting block allows the guide rod to pivot rearwardly in the direction opposite the travel of the disc. Unlike prior art spring mount arrangements, the rubber mounting block allows the guide rod and connected tube to also move from side to side, eliminating the need for frequent adjustment and/or replacement of the spring mount. Thus, the guide rod can move laterally, vertically or rearwardly with the contour of the trench while at the same time always directing the treating additives into the trench.

8 Claims, 3 Drawing Sheets

MOUNT FOR AGRICULTURAL ADDITIVE CONDUIT

BACKGROUND OF THE INVENTION

This invention relates to a mounting arrangement for an agricultural additive conduit dispensing system which is adapted to be mounted to the rear of a coulter disc assembly, while being in communication with a pressurized source of agricultural additives, for fertilization of the seedbeds in the furrows created by the coulter disc. Prior art devices of this type have failed to provide an easily adjustable, fully flexible agricultural additive conduit that will bend both side to side and front to rear with the contour of the seedbed as the coulter disc and associated agricultural additive dispensing tube are pulled through the soil by a tractor.

SUMMARY OF THE INVENTION

A coulter disc assembly is pulled by a tractor, or other motor vehicle, to create a trench in the ground into which seeds are dispensed. This mounting arrangement for an agricultural additive conduit allows a farmer to dispense agricultural additives, such as either liquid or dry fertilizer, or any other treating additives desired, into the ground so as to come in contact with the seed immediately after the trench is created and before it is covered over. The mounting arrangement consists of an elastomeric mounting block adapted to connect to the coulter disc frame. A rigid guide rod extends from the mounting block downwardly toward the ground. One end of a hollow tube is connected to a supply of agricultural additives and the other end to the lower end of the guide rod. As the coulter disc passes through the ground to create a trench, the lower end of the guide rod is carried in the trench with the tube in close proximity. As the guide rod engages the side walls of the trench, the mounting block allows the guide rod to pivot rearwardly in the direction opposite the travel of the disc. Unlike prior art spring mount arrangements, the rubber mounting block allows the guide rod and connected tube to also move from side to side. Thus, the mounting arrangement rises and falls with the frame for the coulter disc to which it is connected, and the guide rod can move laterally, vertically or rearwardly or in any direction relative to the contour of the trench. This eliminates the need for frequent adjustment or replacement of the spring, as required in the prior art arrangements. Since the additive dispensing tube is connected to the guide rod, it will always point downwardly into the trench, but its lower end is always displaced at a distance above the bottom of the trench to prevent clogging of the tube and its nozzle tip.

DETAILED DESCRIPTION OF THE PREFERRED EMBODIMENT

Figure 2:
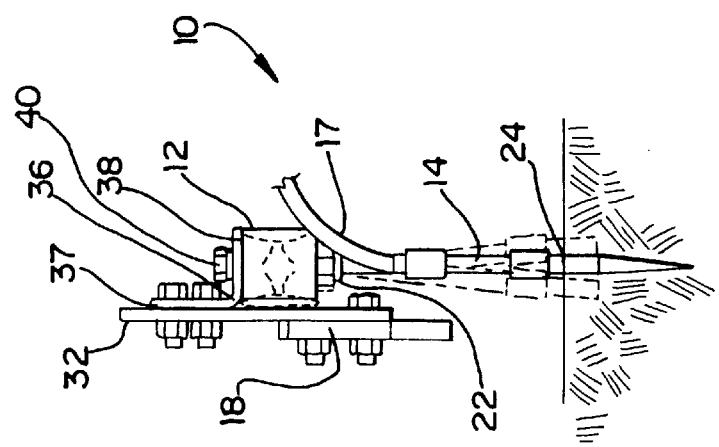
FIG. 2 is a rear view of the present invention connected to the back of the coulter disc assembly of FIG. 1, illustrating the extension of the guide rod into the trench created by the coulter disc and the side-to-side flexibility of the guide rod (shown in phantom) allowed by the rubber mounting block.
Figure 1:
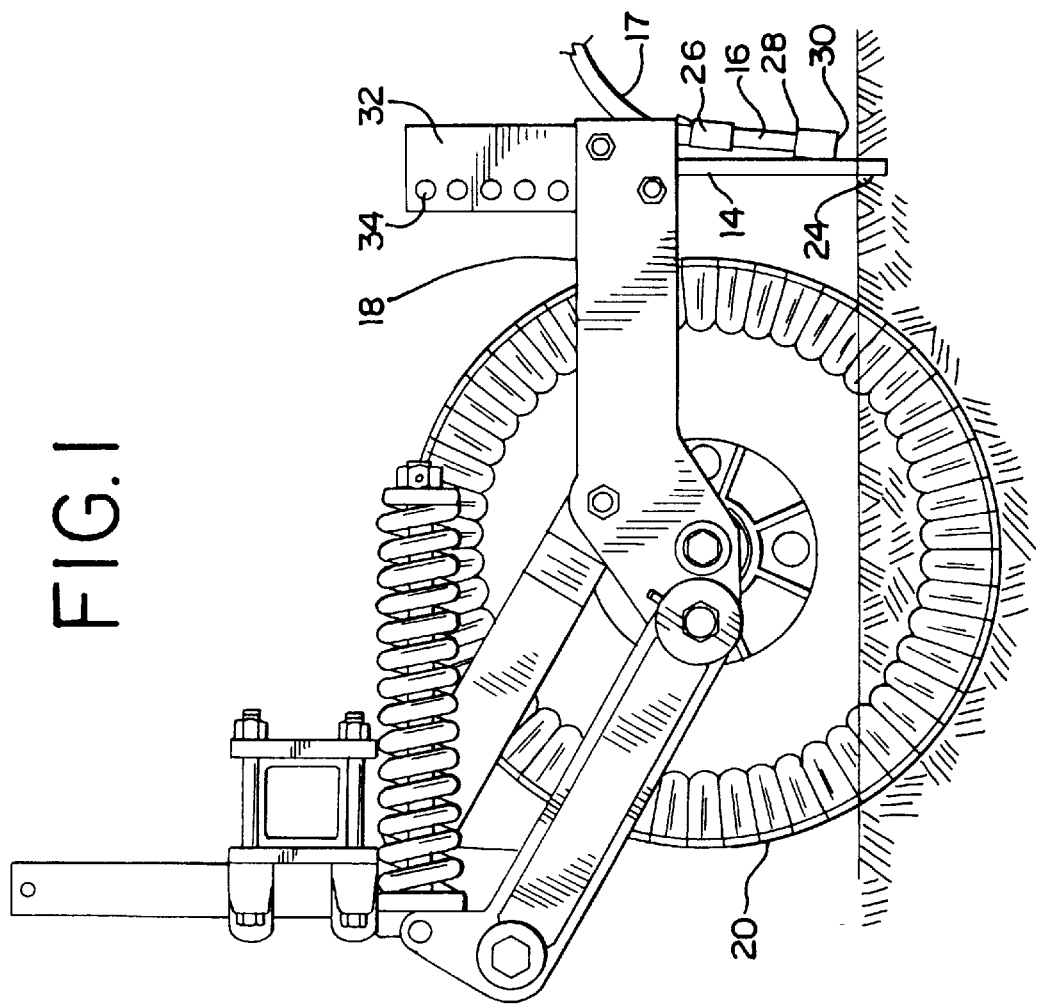
FIG. 1 is a side view of a coulter disc and agricultural additive dispensing mounting assembly in accordance with the present invention.

The present invention is directed to a mounting arrangement for an agricultural additive dispensing conduit for either liquid or dry fertilizer, or any other treating additives, which is adapted to be mounted behind a coulter disc, in its path, in a non-tilling manner, and which flexes to the contour of the trench created in the soil by the coulter disc. As shown in FIGS. 1 and 2, the mounting arrangement, generally designated with numeral 10, includes an elastomeric mounting block 12, a guide rod 14 and a hollow tube or conduit 16. The mounting arrangement 10 is designed to be connected to the frame support 18 of a coulter disc 20.

Figure 5:
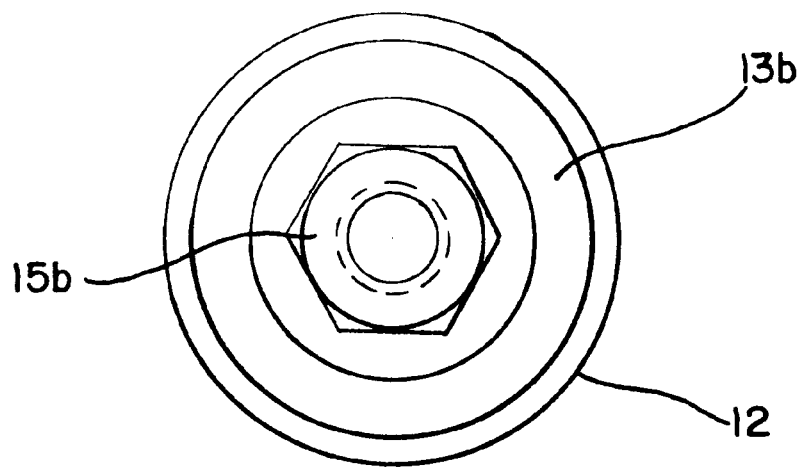
FIG. 5 is an end view of the rubber mounting block in accordance with the present invention.
Figure 6:
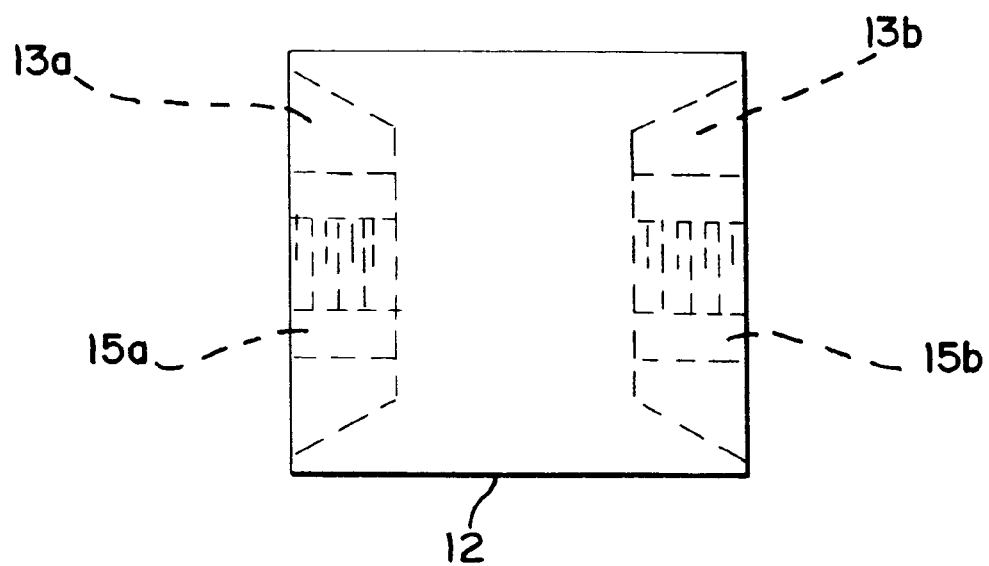
FIG. 6 is a side view, partially broken away, of the rubber mounting block of FIG. 5, illustrating the molded metal portion and welded nut member.

With reference to the drawings, and particularly FIGS. 5 and 6, the mounting block 12 is made of an elastomeric material, such as rubber, to allow for flexibility in all directions. In a preferred embodiment, the mounting block 12 is a cylinder approximately 2 c inches long having a diameter of approximately 2 c inches and is made of oil resistant NEOPRENE rubber of grade ASTM D2000 M3BC710Z1 of between 65 and 70 DUROMETER. The mounting block 12 has two metal portions 13a,b molded approximately 2 inch into each end. Each metal portion 13a,b has a corresponding nut member 15a,b welded onto it.

The guide rod 14 includes a threaded upper end 22 and a lower end 24. The upper end 22 of the guide rod 14 is threadably connected to the nut member 13a of the mounting block 12 while the lower end 24 of the guide rod 14 extends downwardly toward the ground. The guide rod 14 is of a sufficient length to extend into the trench created by the coulter disc 20. The length of course will vary depending on the diameter of the coulter disc 20 and the depth of the trench it is set to cut.

The hollow agricultural additive dispensing tube 16 includes a first end 26 and a second dispensing end 28. The first end 26 of the tube 16 is connected to a flexible rubber or plastic hose 17 which, in turn, is connected to a supply of either liquid or dry fertilizer, or other treating additives (not shown). The second end 28 of the tube 16 is connected to the downwardly extending guide rod 14 for movement therewith by means of a clip or any other securement arrangement such that the central axis of the guide rod 14 and the central axis of the tube 16 are substantially aligned. The second end 28 of the tube 16 defines an exit aperture 30 for dispensing the agricultural additives into the trench created by the coulter disc 20. In the preferred embodiment, the supply of agricultural additives is pressurized so as to force the additives through the hose 17 and tube 16 and out the exit aperture 30 into the trench, in an amount which can be easily metered depending on the speed of the tractor, the depth of the trench and the type of additive being dispensed. A connection is provided, as known to one skilled in the art, for connecting the mounting arrangement 10 to the frame support 18 of the coulter disc assembly 20 (see FIGS. 2 and 3).

A vertically disposed plate 32 is illustrated in FIG. 1 including a plurality of apertures 34. FIG. 2 shows the plate 32 connected to the frame support 18. A flange 36, L-shaped in configuration, is also shown in FIG. 2 attached to the back side of the of plate 32. The flange 36 includes a vertically extending leg 37, which is attached to the plate 32 and a horizontally extending leg 38. The leg 38 forms the base to which the elastomeric mounting block 12 is attached by a bolt 40, as best shown in FIG. 2. The bolt 40 is threadably connected through the leg 38 and into to the nut member 15b of the mounting block 12 thereby securing the mounting block to the leg 38 and frame support 18.

In operation, the frame support 18, which is more fully illustrated and described in U.S. Pat. No. 4,947,770, and attached coulter disc assembly 20 are pulled by a tractor or other motorized vehicle to create trenches in the ground into which seed is dispensed. This mounting arrangement 10 allows a farmer to inject an agricultural additive into the trench, so as to come into contact with the seed, immediately after the trench is created and before it is covered over by furrow closing mechanisms which are well known to those of ordinary skill in the art and which trail the additive dispensing tube.

Figure 3:
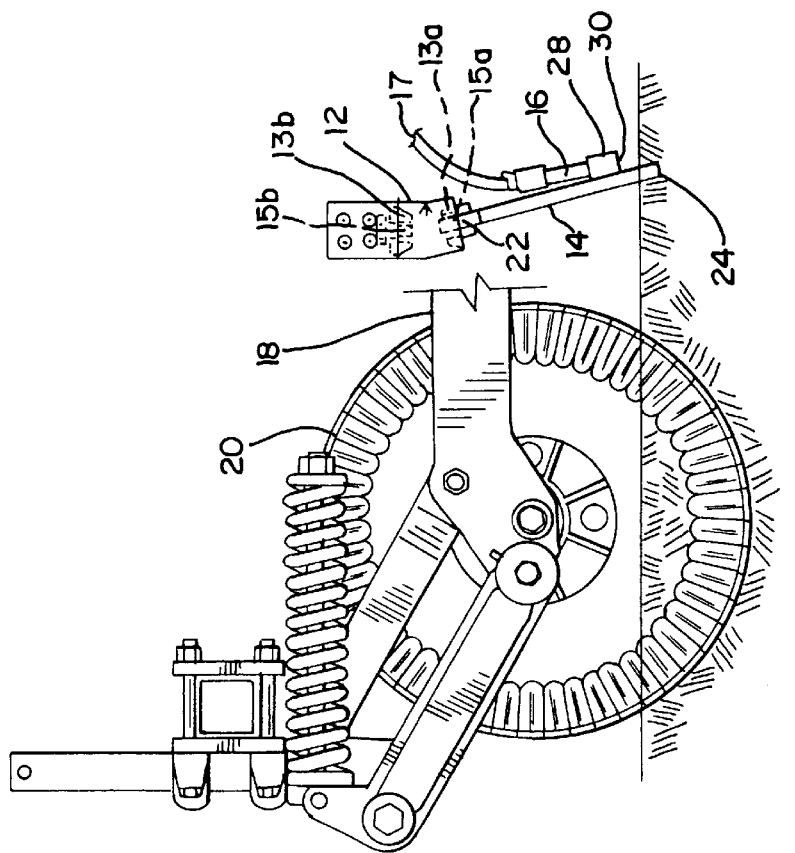
FIG. 3 is a partially-broken-away side view of the coulter disc and agricultural additive dispensing mounting assembly of FIG. 1, illustrating the mounting arrangement of the present invention when the coulter disc is in the stationary position.
Figure 4:
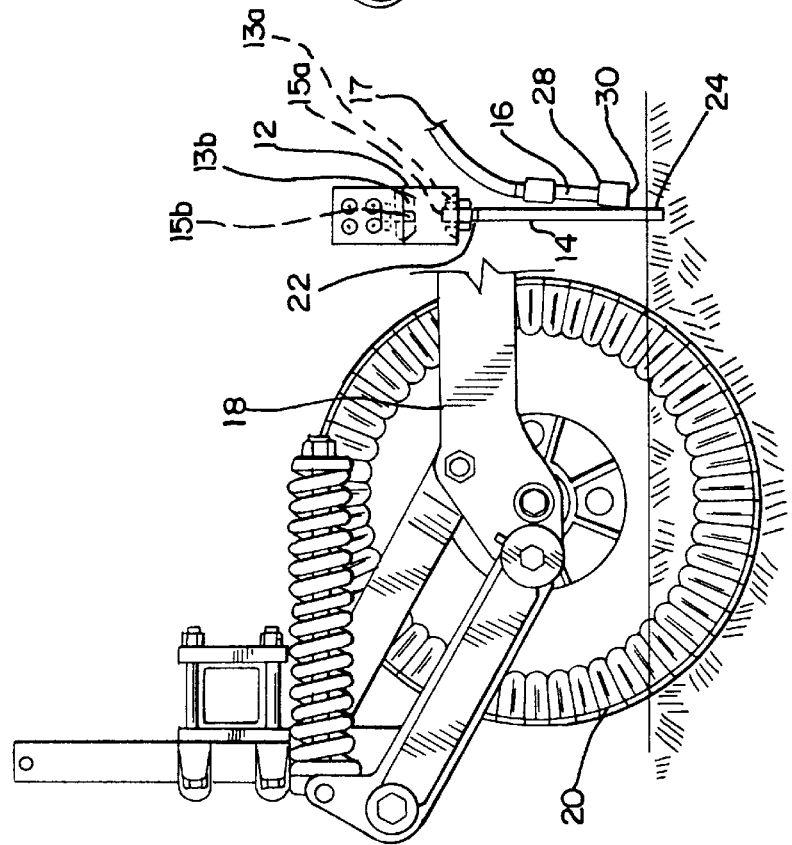
FIG. 4 is a partially-broken-away side view of the coulter disc and fertilizer support assembly of FIG. 1, illustrating the rearward flexibility of the guide rod as it trails the forward moving coulter disc and engages the side walls of the trench when the coulter disc is being pulled across the ground.

In FIG. 1, the mounting arrangement 10 is shown as attached to the rear of the frame support 18, allowing for the guide rod 14 to extend downwardly into the trench below the ground surface. FIG. 3 illustrates the coulter disc 20 and related mounting assembly at rest, with the guide rod 14 extending straight down. As shown in FIG. 4, as the frame support 18 and attached coulter disc assembly 20 move forward, the guide rod 14 engages the sidewalls of the trench and pivots rearwardly in a trailing, non-tilling manner, in the direction opposite the travel of the frame support 18 and attached coulter disc assembly 20. The elastomeric properties of the mounting block 12 allow the guide rod 14 to flex both front-to-rear and side-to-side with the contour of the sidewalls of the trench as the tractor moves across the ground. The ability of the lower end 24 of the guide rod 14 to move in any direction within the trench and to continue to point the exit aperture 30 of the additive dispensing tube 16 downwardly into the trench becomes important when the guide rod 14 engages rocks, wood, or other solid, foreign objects in the soil. As illustrated in FIG. 2, the guide rod 14 has the ability to swipe around the sides of these objects, not just over them, decreasing the risk of a fracture in the structure of the mounting arrangement 10.

The second end 28 of the tube 16 is connected to the guide rod 14, allowing for the exit aperture 30 to always point downwardly into the trench. However, the second end 28 of the tube 16 is displaced at a distance above the bottom of the trench so as to prevent blockage of the exit aperture 30 by the soil in the trench. As the mounting arrangement 10 follows the frame support 18 and attached coulter disc assembly 20 as they move forward to create trenches in the ground, the supply of agricultural additive forces the additive through the tube 16 (which is connected to the guide rod 14), out the exit aperture 30, and directly into the newly created trench.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A mounting arrangement for an agricultural additive dispensing conduit including:

a frame member adapted to be moved over soil to be tilled and fertilized;

an elastomeric mounting block mounted on said frame member;

a guide rod having an upper end attached to said elastomeric mounting block and a lower end extending from said mounting block, said guide rod being of a length sufficient to engage the side walls of a trench, said lower end capable of flexing both axially and transversely; and a conduit including an inlet and an outlet, said inlet adapted to be connected to a supply of treating additive, said conduit attached to said guide rod for movement therewith such that said outlet is positioned for applying treating additive within the trench.

2. A mounting arrangement in accordance with claim 1 wherein said conduit includes a hose secured to and spaced upwardly from said lower end of said guide rod.

3. A mounting arrangement in accordance with claim 1 wherein said elastomeric mounting block is rubber.

4. A mounting arrangement for an agricultural additive dispensing conduit adapted to dispense an agricultural additive into a trench, said mounting arrangement including:

an elastomeric mounting block adapted to be connected to a frame member;

a guide rod having an upper end connected to said elastomeric mounting block and a lower end extending from said mounting block so as to permit movement of said lower end of said guide rod from side to side and from front to rear; and an agricultural additive dispensing conduit connected to said guide rod for movement therewith, said conduit defining an aperture at one end thereof for dispensing an agricultural additive into a trench, said conduit adapted to be connected to a supply of agricultural additive to be dispensed, whereby said guide rod is positioned so as to extend into the trench and said elastomeric mounting block allows for movement of said guide rod to conform to the contour of the trench, thereby positioning said aperture of said conduit so as to deposit the agricultural additive directly into the trench.

5. A mounting arrangement in accordance with claim 4 including a first central axis of said guide rod and a first central axis of said dispensing conduit and means for connecting said dispensing conduit to said guide rod such that said central axis of said guide rod and said central axis of said dispensing conduit are substantially aligned.

6. A mounting arrangement in accordance with claim 4 wherein said mounting block is rubber.

7. A mounting arrangement in accordance with claim 4 including means for connecting said elastomeric mounting block to a movable frame member.

8. An agricultural implement including:

a frame member having a first end and a second end, said frame member adapted to be attached to a vehicle for movement over soil;

a coulter disc connected to said frame member and mounted for rotation about an axis, said disc operative for tilling engagement with the soil over which said frame member is moved to form a trench therein;

an elastomeric joint member connected to said frame member;

a guide rod having an upper end attached to said elastomeric joint member and a lower end disposed behind and aligned with said coulter disc, said lower end extending from said joint member, said guide rod being of a length sufficient to engage the side walls of the trench, said lower end of said guide rod adapted to flex both axially and transversely with the contour of the soil over which said frame member is passing and said coulter disc is engaging; and an agricultural additive dispensing conduit secured to said guide rod, said conduit including a first end adapted to be connected to a source of agricultural additive and a second end defining an aperture for dispensing an agricultural additive, said agricultural implement operative such that, when said coulter disc engages and tills the soil, forming the trench, said guide rod is positioned so as to extend into the trench and to engage the side walls of the trench and said elastomeric joint member allows for movement of said guide rod both side to side and front to rear to conform to the contour of the soil, thereby positioning said aperture of said conduit so as to dispense the agricultural additive directly into the trench.

* * * * *